United States Patent [19]

Manganese

[11] Patent Number: 4,649,811
[45] Date of Patent: Mar. 17, 1987

[54] STEAM COOKING DEVICE

[76] Inventor: Jean L. Manganese, 7144 Chabot, Apt. 2, Montreal, Quebec, Canada

[21] Appl. No.: 826,842

[22] Filed: Feb. 6, 1986

[51] Int. Cl.$^4$ ............................................. A47J 27/04
[52] U.S. Cl. ........................................ 99/417; 126/369
[58] Field of Search .......................... 99/403, 410–418, 99/447; 126/369

[56] References Cited

U.S. PATENT DOCUMENTS

| | | | |
|---|---|---|---|
| 1,460,975 | 7/1923 | Miller | 99/410 |
| 3,636,860 | 1/1972 | Green | 99/418 X |
| 4,094,295 | 6/1978 | Boswell | 99/417 X |
| 4,495,860 | 1/1985 | Hitch | 99/417 X |

*Primary Examiner*—Billy J. Wilhite
*Attorney, Agent, or Firm*—Robic, Robic & Associates

[57] ABSTRACT

A steam cooking device having an outer shell with an open top and an open bottom. A cover closes the open top. The open bottom is sized to fit about a heating element. A support member is provided within the outer shell, for supporting food to be cooked. This support member is spaced above the bottom of the outer shell to provide space within the shell for a water container.

5 Claims, 6 Drawing Figures

STEAM COOKING DEVICE

BACKGROUND OF THE INVENTION

The present invention relates to a novel cooking device, and more particularly to a cooking device employing steam to cook food.

It is well known that steam cooking provides slower, more controlled cooking of certain foods. In addition, steam cooking prevents drying out of certain foods when cooked.

It is the purpose of the present invention to provide a relatively simple and inexpensive cooking device that can be used to steam cook foods. It is another purpose of the present invention to provide a cooking device that can be readily converted from a steaming device to a baking device.

SUMMARY OF THE INVENTION

In one embodiment of the invention, the cooking device can be used to steam cook food that is carried in one or more containers that can be stacked one on top of the other within a closed outer shell. In another embodiment of the invention, the cooking device can be used to steam cook food that is openly carried by food support Shelf mounted onto an inner shell. In each embodiment, steam is generated within the closed outer shell to cook the food carried therein.

In greater details, the cooking device according to the invention employs an outer shell with a cover for closing the shell. Means are provided within the shell for supporting food therein spaced above the bottom of the outer shell.

In the one embodiment, the food support means comprises a support member having a base for holding stackable food containers within the shell. In the other embodiment, the food support means comprises an inner shell with a base and a set of adjustable support shelves. The inner shell is mounted within the outer shell.

In both embodiments, the food support means are located above the bottom of the outer shell at a distance sufficient to provide space within the outer shell for a water container used as steam generator. This water container may consist of a shallow, open, water-carrying pan that can be placed inside the outer shell beneath the food support means. When the cooking device is set over a cooking element such as the standard electrical heating element of a stove, and the pan is placed on the element, water in the pan is converted to steam when the element is turned on, to cook food carried in the device above the pan.

If desired, the water pan can be removed to convert the device to an oven. Indeed, when the device is placed over a stove element without any water pan, food carried within the device can be baked when the element is turned on.

The cooking device according to the invention can be provided with its own heating means. The heating means would be located in the bottom of the device and would support the water pan spaced below the food support means.

The invention as claimed is particularly directed toward a cooking device having an outer shell with an open top and an open bottom. Cover means are provided for closing the open top of the outer shell. The open bottom of the outer shell is sized to fit about a heating element. A support member is provided with the outer shell. This member has a base for supporting food to be cooked and this base is spaced above the bottom of the outer shell to provide space within the bottom of the shell for a water container.

BRIEF DESCRIPTION OF THE DRAWINGS

The invention will be better understood with reference to the following description of two preferred embodiments thereof, taken in connection with the accompanying drawings in which.

DESCRIPTION OF TWO PREFERRED EMBODIMENTS

Figure 1:
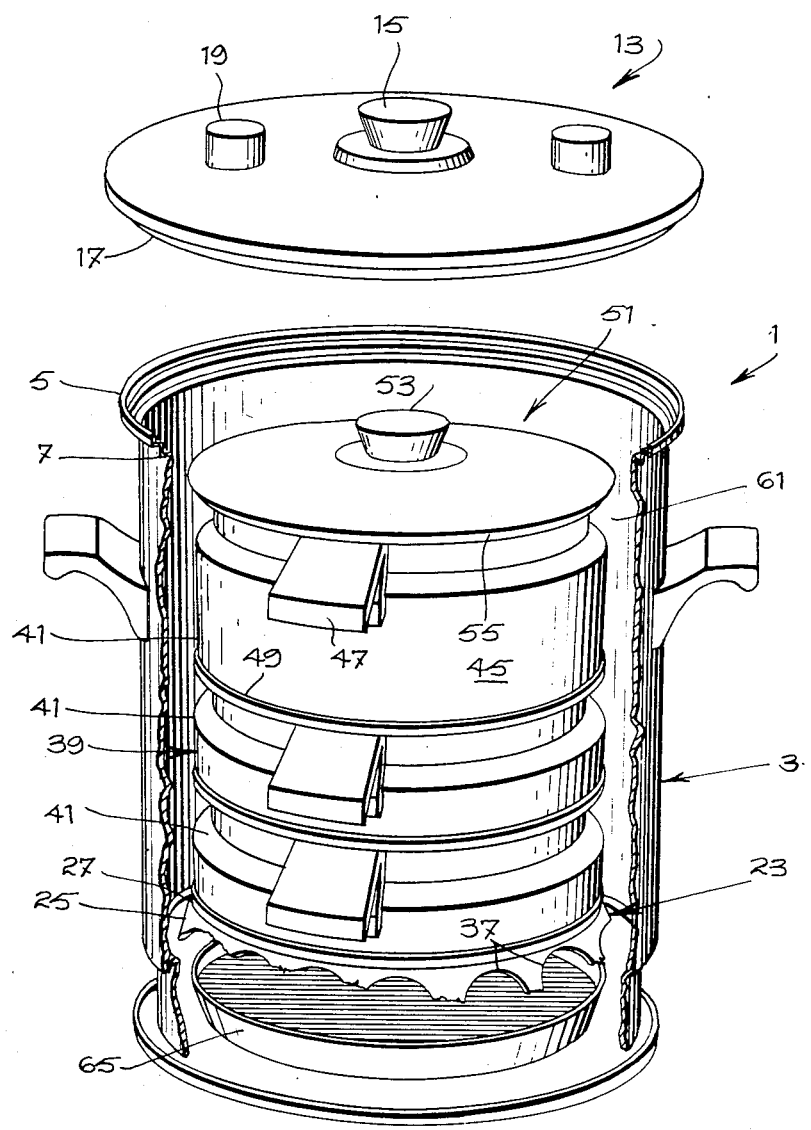
FIG. 1 is a partially broken-away perspective view of a first embodiment of a cooking device according to the invention.
Figure 2:
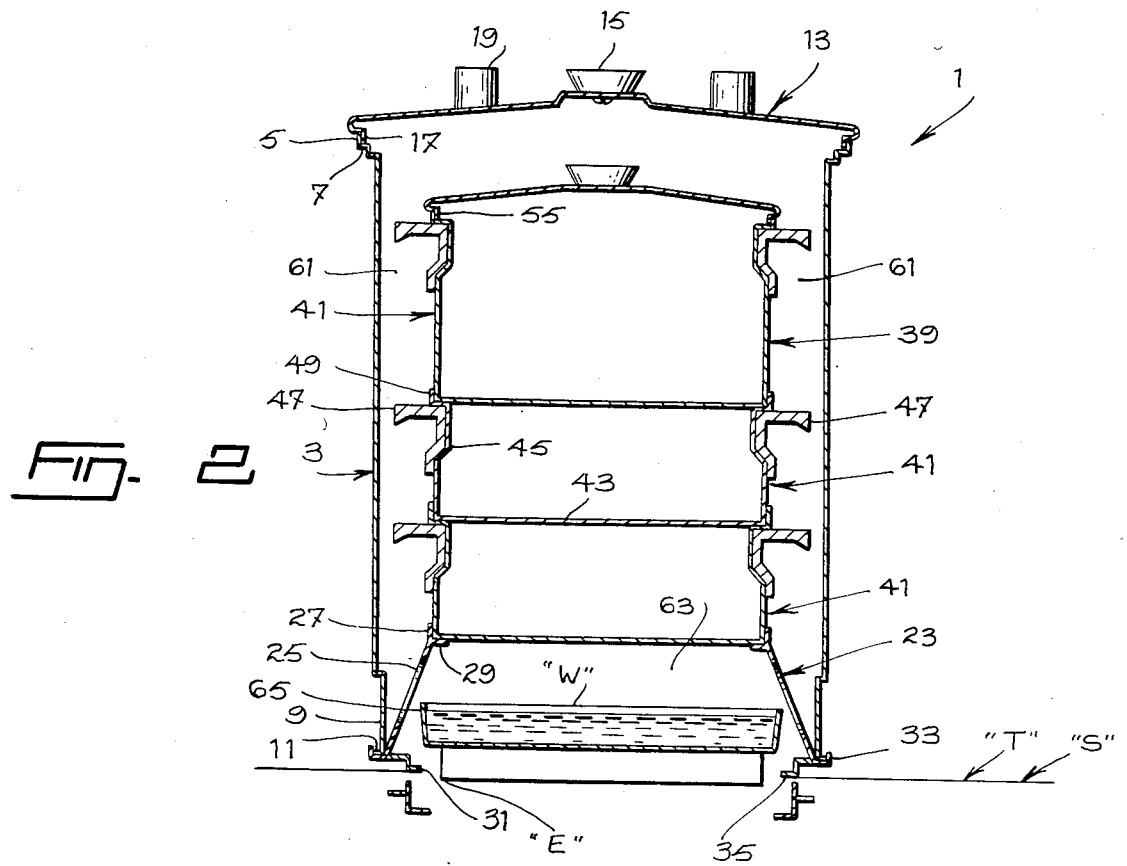
FIG. 2 is a cross-section view of the cooking device shown in FIG. 1.
Figure 3:
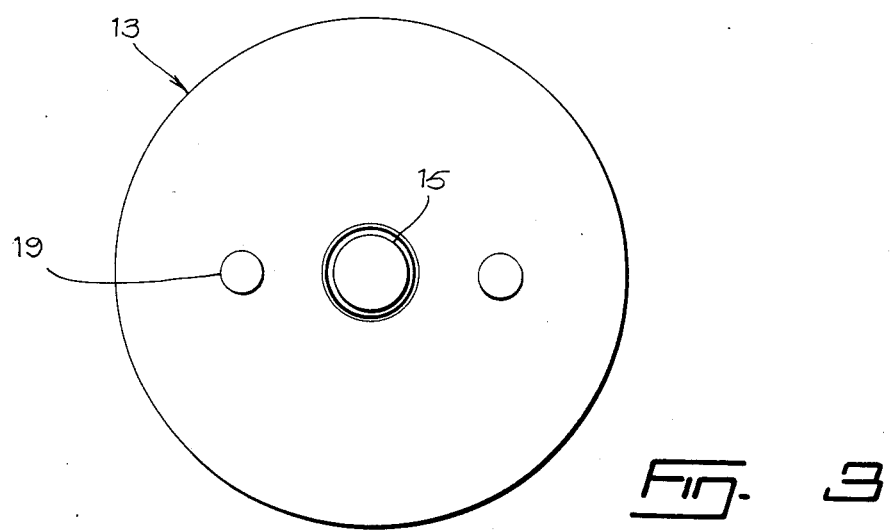
FIG. 3 is a top view of the cooking device shown in FIGS. 1 and 2.

The cooking device 1 according to the invention as shown in FIGS. 1 to 3, has an outer shell 3 that has a cylindrical shape. Both ends of the shell 3 are open. The open upper end 5 of the shell 3 is stepped outwardly as shown at 7. The open bottom end 9 of the shell 3 has an outwardly directed base flange 11.

The cooking device 1 has a cover 13. The cover 13 has a central handle 15 and a downwardly directed flange 17 that is sized to fit snugly within the step 7 at the upper end of the shell 3. The cover 13 seals tightly with the shell 3 to prevent steam from escaping from within the shell. The cover 13 can be provided with at least one relief valve 19 to allow the escape of steam from within the shell if the pressure builds up past a predetermined value.

The shell 3 can rest via its base flange 11 directly on the top surface "T" of a stove "S", surrounding a heating element "E" on the stove "S". Preferably however, the shell 3 is supported on a food support member 23. The support member 23 has a sidewall 25 defining a truncated conical shape. The smaller, upper end 27 is open and is provided with an inwardly-directed flange forming a food support base 29. The larger, lower end 31 of the support member 23 is also open and is provided with an outwardly-directed, support flange 33 and an inwardly-directed bottom flange 35 just below the support flange 33. The sidewall 25 has large openings 37. In use, the support member 23 is placed on the stove "S" with its bottom flange 35 resting on the top surface "T" and surrounding the element "E" as shown in FIG. 2. The outer shell 3 is mounted over the support member 23 with its base flange 11 resting on the support flange 33.

Means are provided within the outer shell 3 for holding food to be cooked. The food holding means 39 can comprise at least one container adapted to be mounted on the food support member 23 within the shell. Preferably, a plurality of stackable containers 41 are employed. Three such containers 41 are shown in FIG. 1. Each container 41 has a bottom wall 43, a sidewall 45, handles 47 mounted on the sidewall 45, and a mounting flange 49 on the top edge of the sidewall 45. The bottom of each container 41 fits snugly within the mounting flange 49 of the container beneath it thereby forming a cover. A separate cover 51, having a handle 53 and an outer, downwardly-turned flange 55 that fits snugly within the mounting flanges 49 on any of the containers 41, closes the top container in the stack. The bottom container in the stack sits on the base 29 of the support member 23.

The containers 41 are sized so as to be spaced inwardly of the outer shell 3 when stacked, thus providing an annular channel 61 through which steam can circulate. Some of the containers 41 can be made deeper than others so as to hold more food. The support member 23 is sized to support the bottom container 41 a short distance above the element "E" providing a steam circulating space 63 within the support member 23 and the bottom portion of the outer shell 3.

The cooking device 1 includes a separate, open pan 65 sized to sit on the element "E" within the support member 23. The pan 65 is located within the space 63 and below the bottom container 41.

In use, the pan 65 is filled with water "W" and placed on the heating element "E". The support member 23 is mounted on the stove "S" over the pan 65, and the shell 3 is mounted on the member 23. Containers 41 of food are stacked and mounted on the member 23, above the pan 65, within the shell 3. The cover 13 closes the shell 3. The element "E" is turned on to heat the water in the pan 65 and create steam. The steam circulates in the spaces 61 and 63 to cook the food in the containers 41, and escapes through the relief valve 19 if the pressure builds up too high within the shell 3.

Figure 4:
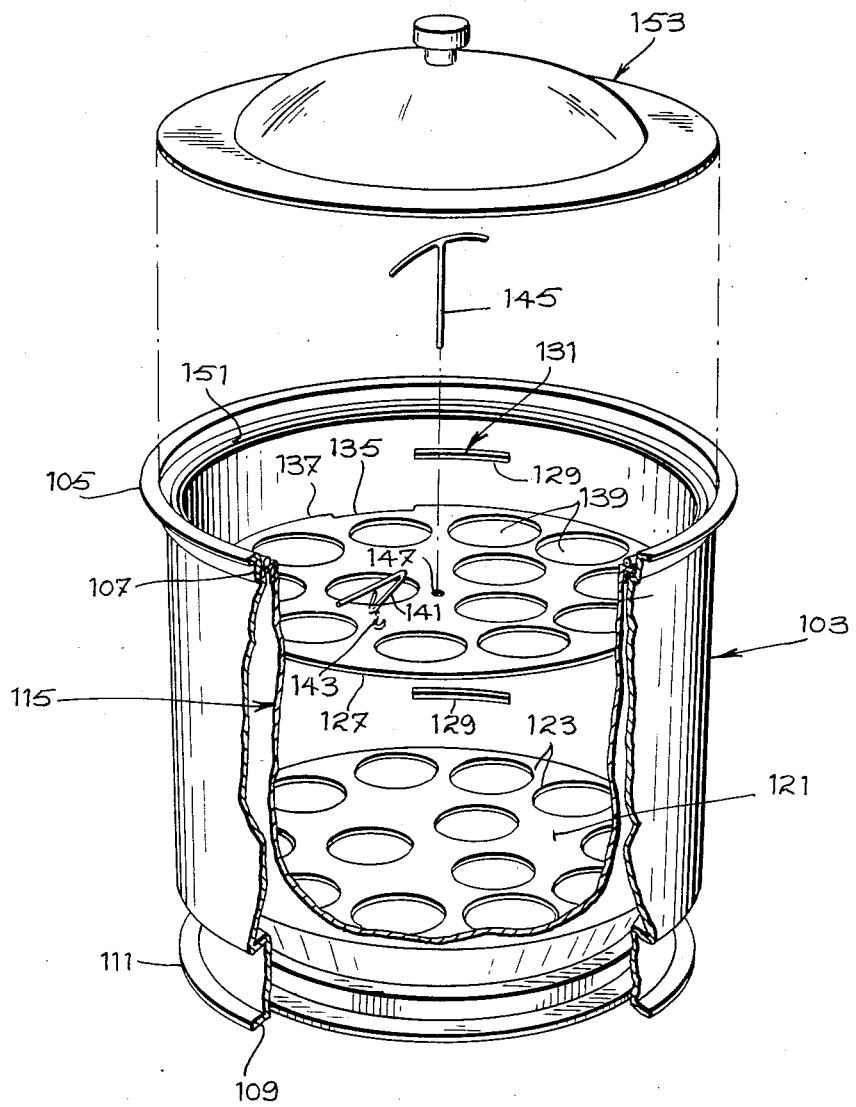
FIG. 4 is a view similar to FIG. 1 of a second preferred embodiment of a cooking device according to the invention.
Figure 5:
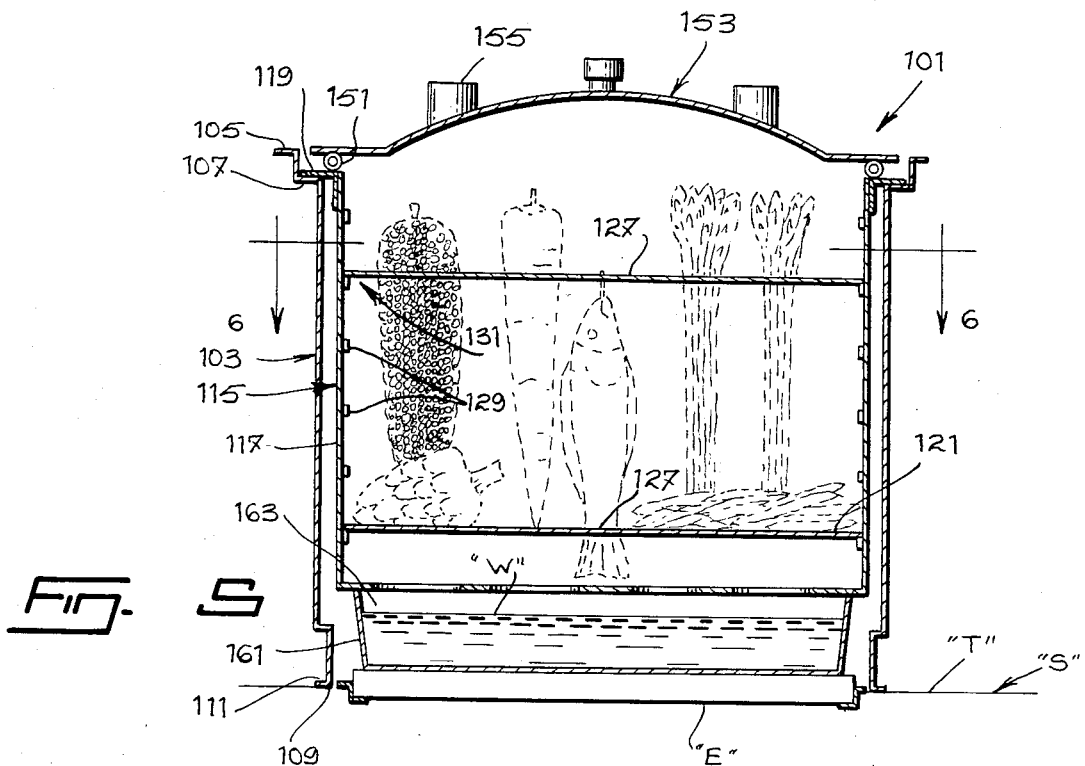
FIG. 5 is a cross-section view of the cooking device shown in FIG. 4.
Figure 6:
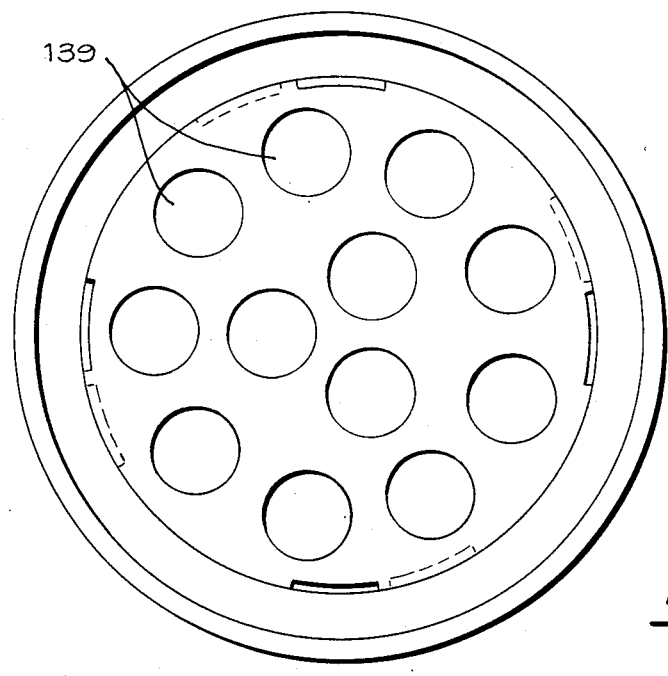
FIG. 6 is a cross-section view taken along line 6—6 in FIG. 5.

In accordance with another embodiment of the invention, shown in FIGS. 4 to 6, the cooking device 101 can comprise an outer shell 103 that has a cylindrical shape. Both ends of the shell 103 are open. The upper end 105 of the shell 103 is stepped outwardly as shown at 107. The bottom end 109 of the shell has an outwardly-directed base flange 111.

A food support member 115 is provided within the shell 103 for supporting food to be cooked. The food support member 115 has an inner cylindrical shell 117 adapted to be supported generally concentrically within the outer shell 103. The top edge of the inner shell 117 has an outwardly-directed flange 119. The inner shell 117 is generally concentrically supported within the outer shell 103 with the flange 119 resting on the step 107. The top of the inner shell 117 is open while the bottom is closed by a bottom wall 121 having openings 123 therein.

The food support member 115 preferably includes at least one food support shelf 127. Two such shelves 127 are shown in the drawings. Each shelf 127 is circular in shape and is sized to just fit within the inner shell 117. A series of vertically spaced-apart support ribs 129 is provided on the inner surface of the inner shell 117. The ribs 129 are arranged in four vertical rows 131, each row 131 located radially about ninety degrees from the adjacent rows. Each row 131 extends substantially over the height of the inner shell. Each support shelf 127 is provided with four cutouts 135 in its peripheral outer edge 137. The cutouts 135 are equally spaced-apart, and each is just slightly larger than a rib 129. The shelves 127 can be mounted at different levels within the inner shell 117. Each shelf 127 is placed within the inner shell 117 through its open top end 105 and rotated to align its cutouts 135 with the rows 131 of ribs 129. The shelf 127 can then be lowered within the shell 117 to the desired level and rotated slightly to misalign the cutouts 135 with the ribs 129 at that level so that the shelf 127 will rest on the ribs 129 in a generally horizontal position at that level.

Each shelf 127 is provided with a plurality of openings 139 through which food to be cooked can be suspended. In addition, support hooks 141 can be provided which extend across an opening 139 and support food from a hook 143. The uppermost shelf 127 can be provided with a T-shaped handle 145 that screws into a threaded central opening 147 in the shelf 127.

A flexible seal 151 is provided on the top circular flange 119 of the inner shell 117. A cover 153 rests on the seal 151 to close the open top of the inner shell 117. A relief valve 155 can be provided in the cover 153. The cover 153 also serves to close the top of the outer shell 103.

The cooking device 101 includes a separate, open pan 161 that is sized to sit on a cooking element "E" of a stove "S". The pan 161 is located in a steam circulating space 163 beneath the bottom wall 121 of the inner shell 117.

In use, the pan 161 is filled with water "W" and placed on a stove element "E". The outer shell 103 is placed over the pan 161, resting on the stove "S", and the inner shell 117 is supported within the outer shell 103 with its bottom wall 121 spaced above the pan 163. The food support shelves 127 are set to the desired height and food to be cooked is placed on, or carried by, the bottom wall 121 and the shelves 127. The inner shell 117 is closed with the cover 153. The steam rising from the pan 161, when the water is heated, circulates through the inner shell 117 cooking the food therein. The openings 123 in the bottom wall 121, and the openings 139 in the shelves 127, permit steam circulation.

In both embodiments, the cooking device 1, 101 is constructed to be placed over a stove element "E". However, it is contemplated that each cooking device can be provided with its own heating element, built into the bottom of the support member 23 in cooking device 1, or built into the bottom of outer shell 103 in cooking device 101. The built-in heating element would have a power cord and a switch. The water pan 65, 161 would sit directly on the built-in heating element.

Such a variant is minor and can be easily reduced into practice with well known and conventional parts.

Both embodiments of the cooking device, with or without a built-in heating element, can also be used as a cooking oven by applying heat without using the water pan 65 or 161.

What is claimed is:

1. A cooking device comprising:
    an outer shell with an open top and an open bottom, the open bottom of said outer shell being sized to fit about a heating element;
    cover means for closing the open top of the outer shell; and
    a support member within the outer shell, said support member having a base for supporting food to be cooked, said base being spaced above the bottom of the outer shell to provide space within the bottom of the shell for a water container, wherein said support member has a bottom portion below the base, and means adjacent the bottom portion for supporting the outer shell by its open bottom.

2. A cooking device as claimed in claim 1, wherein the support member has a perforated wall joining the base and the bottom portion.

3. A cooking device as claimed in claim 2, further comprising at least one food container and a cover for said food container, said food container being sized to sit on the base of the support member while spaced inwardly of the outer shell.

4. A cooking device as claimed in claim 3, further comprising an open water container sized to be placed within the space within the bottom of the outer shell.

5. A cooking device as claimed in claim 2, further comprising at least two food containers and a cover for a food container, said food containers having means to stack them one on top of the other, each food container being sized to sit on the base of the support member while spaced inwardly of the outer shell.

* * * * *